US007023583B2

(12) United States Patent
Kato

(10) Patent No.: US 7,023,583 B2
(45) Date of Patent: Apr. 4, 2006

(54) METHOD AND APPARATUS FOR USE IN IMAGE FORMING APPARATUS

(75) Inventor: Mitsuhisa Kato, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 888 days.

(21) Appl. No.: 09/964,633

(22) Filed: Sep. 28, 2001

(65) Prior Publication Data

US 2003/0063320 A1 Apr. 3, 2003

(51) Int. Cl.
*H04N 1/40* (2006.01)

(52) U.S. Cl. ........................................ 358/1.9; 358/446

(58) Field of Classification Search ................. 358/1.7, 358/1.9, 2.1, 446, 296–301, 468
See application file for complete search history.

(56) References Cited

U.S. PATENT DOCUMENTS 5,357,317 A * 10/1994 Fukuchi et al. ............... 399/39
5,486,901 A * 1/1996 Fukuchi et al. ............... 399/40
5,523,825 A * 6/1996 Satoh et al. ................ 399/128

FOREIGN PATENT DOCUMENTS

JP 5-346712 12/1993

* cited by examiner

*Primary Examiner*—Thomas D. Lee
*Assistant Examiner*—Stephen Brinich
(74) *Attorney, Agent, or Firm*—Foley & Lardner LLP

(57) ABSTRACT

In an image forming apparatus according to the invention, the potential of an optical semiconductor is increased in a predetermined time period, in which a recording medium does not exist in a transfer region between the optical semiconductor and a transfer unit, so as to set a difference between a developing bias voltage and the potential of the optical semiconductor larger than a difference therebetween assumed when toner is being transferred onto the recording medium.

13 Claims, 5 Drawing Sheets

METHOD AND APPARATUS FOR USE IN IMAGE FORMING APPARATUS

BACKGROUND OF THE INVENTION

The present invention relates to an image forming apparatus that includes a developing unit for developing an electrostatic image using toner as a visualizing material, and is used to form an image corresponding to an object or an output signal, and also relates to an image forming method.

In developing units (developing methods) to be incorporated in an image forming apparatus using electrophotography, it is known that some employ a two-component developer containing a carrier and toner, and others employ a one-component developer containing only toner.

In the case of the two-component developing system, toner is attached to carrier particles and conveyed to the outer periphery of a developing sleeve, and a developer layer of a predetermined thickness is formed on the sleeve using a doctor blade. This developer layer is brought into contact with the surface of a photosensitive drum, thereby separating the toner from the carrier by the Coulomb force of an electrostatic latent image pre-formed on the photosensitive drum, and then applying the toner to the electrostatic latent image. Thus, the electrostatic latent image is developed.

In the case of the one-component developing system, a thin layer formed of only toner is formed on the outer periphery of the developing sleeve, and the photosensitive drum and the developing sleeve are opposed to each other with a predetermined space therebetween (or are put in contact with each other), thereby applying toner to an electrostatic latent image formed on the photosensitive drum to develop it.

At the present stage, although the phenomenon that occurs in a developing area, in which the developing sleeve and the photosensitive drum are opposed, accords to that occurring in the one-component developing system, a semi two-component developing system that uses a small amount of magnetic carrier is also proposed.

The semi two-component developing system is a developing system that uses, as a developer, a small amount of carrier (magnetic material) and a magnetic toner that contains magnetic material particles whose ratio to the toner is predetermined. In this method, a carrier thin layer made of a predetermined amount of carrier is formed on the developing sleeve and used to efficiently convey the magnetic toner to the developing area in which the photosensitive drum and the developing sleeve are opposed.

In the semi two-component developing system, at the present stage, a mixture of toner and a predetermined amount of magnetic material particles is widely used, as well as toner that contains magnetic material particles therein, in order to enhance the build up of the electrostatic charge characteristic of the toner. However, if an image forming process, i.e., printing output is repeated using the mixture of toner and magnetic material particles, the attached magnetic material particles may be separated from the surfaces of toner particles by stress, which is represented by the pressure applied between the developing sleeve and the doctor blade (toner layer thickness limiting member), pressure and friction resulting from a toner mixing mechanism and/or friction between toner particles. The magnetic material particles separated from the toner particle surfaces remain at a predetermined portion of the developing unit, and may cause white-background fogging (background fogging) on a non-imaging section (white-background section).

BRIEF SUMMARY OF THE INVENTION

It is an object of the present invention to provide an image forming apparatus and method capable of preventing fogging in a non-imaging section even if the number of times of image forming is increased.

The present invention provides an apparatus for supplying a visualizing agent to a latent image to thereby form an image, comprising:

a visualizing agent formed of a mixture of a resin material and magnetic particles, the ratio of the magnetic particles to the resin material being predetermined, magnetic particles of a same material as the first-mentioned magnetic particles being attached to a surface of the mixture;

a recording-medium conveyance mechanism which can convey a recording medium which holds thereon the visualizing agent stuck to selected portions of a latent image carrier;

a first voltage supply unit which can output a first voltage to charge the latent image carrier with a predetermined potential, and also which can output a second voltage, differing from the first voltage, to charge the latent image carrier with another predetermined potential;

a second voltage supply unit which can output a third voltage, differing from the first and second voltages, to attach the visualizing agent to the selected portions of the latent image carrier; and a collecting unit which can collect the attached magnetic particles when the magnetic particles are separated from the visualizing agent attached on the latent image carrier by a difference between the third voltage supplied from the second voltage supply unit and the second voltage supplied from the first voltage supply unit.

Further, the present invention provides an image forming apparatus comprising:

a photosensitive unit which can hold, as a latent image, a potential difference between an exposed portion thereof which is irradiated with light, and a non-exposed portion thereof which is not irradiated with light, when light has been emitted onto the photosensitive unit charged with a predetermined potential;

a charger unit which can output a first voltage used to supply a predetermined surface potential to the photosensitive unit, and also output a second voltage differing from the first voltage;

an exposure unit which can emit light onto the photosensitive unit supplied with the predetermined surface potential from the charger unit, the light having its intensity varied in accordance with image data;

a developing unit including a sleeve opposed to the photosensitive unit with a predetermined space defined therebetween, the developing unit supplying the surface of the photosensitive unit with toner, thereby developing the latent image held on the photosensitive unit, the toner being formed of a resin material containing magnetic particles, the ratio of the magnetic particles to the resin material being predetermined, magnetic particles of a same material as the first-mentioned magnetic particles being attached to a surface of the toner;

a recording-medium conveyance mechanism which can convey, to the photosensitive unit, a recording medium which can electrostatically hold the toner supplied by the developing unit to the latent image on the photosensitive unit;

a transfer unit which can electrostatically transfer the toner supplied by the developing unit to the latent image on the photosensitive unit, onto the recording medium conveyed to the photosensitive unit by the recording-medium conveyance mechanism;

a recording-medium discharge mechanism which can convey, to a predetermined position, the recording medium with the toner electrostatically transferred by the transfer unit from the photosensitive unit;

a developing-bias-voltage supply unit which can supply the sleeve of the developing unit with a third voltage that differs by a predetermined potential from the first voltage applied to the photosensitive unit by the charger unit;

a voltage control circuit which can change a voltage, applied by the charger unit to the photosensitive unit, from the first voltage to the second voltage for a predetermined time period in which no toner is electrostatically transferred by the transfer unit onto the recording medium conveyed by the recording-medium conveyance mechanism, so as to set a difference between the second voltage and the third voltage applied to the sleeve of the developing unit by the developing-bias-voltage supply unit, larger than a difference between the first and third voltages; and a collecting unit which can collect the magnetic particles separated from the toner and existing on the photosensitive unit.

Furthermore, the present invention provides an image forming method of supplying a visualizing agent onto a latent image to form an image, comprising:

forming a latent image on an optical semiconductor by emitting light selected portions of the optical semiconductor with a predetermined potential applied to the optical semiconductor;

supplying toner to the latent image formed on the optical semiconductor, while applying a predetermined bias voltage to the optical semiconductor; and collecting, in a predetermined time period in which a recording medium does not exist in a transfer region defined between the optical semiconductor and a transfer unit, other than when the toner is being transferred onto the recording medium, magnetic particles separated from the toner attached to the optical semiconductor, into a predetermined collecting section, by increasing the potential of the optical semiconductor, so as to set a difference between the developing bias voltage and the potential of the optical semiconductor larger than a difference therebetween assumed when the toner is being transferred onto the recording medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An image forming apparatus in which a developing method according to the present invention is used will be described in detail with reference to the accompanying drawings.

Figure 1:
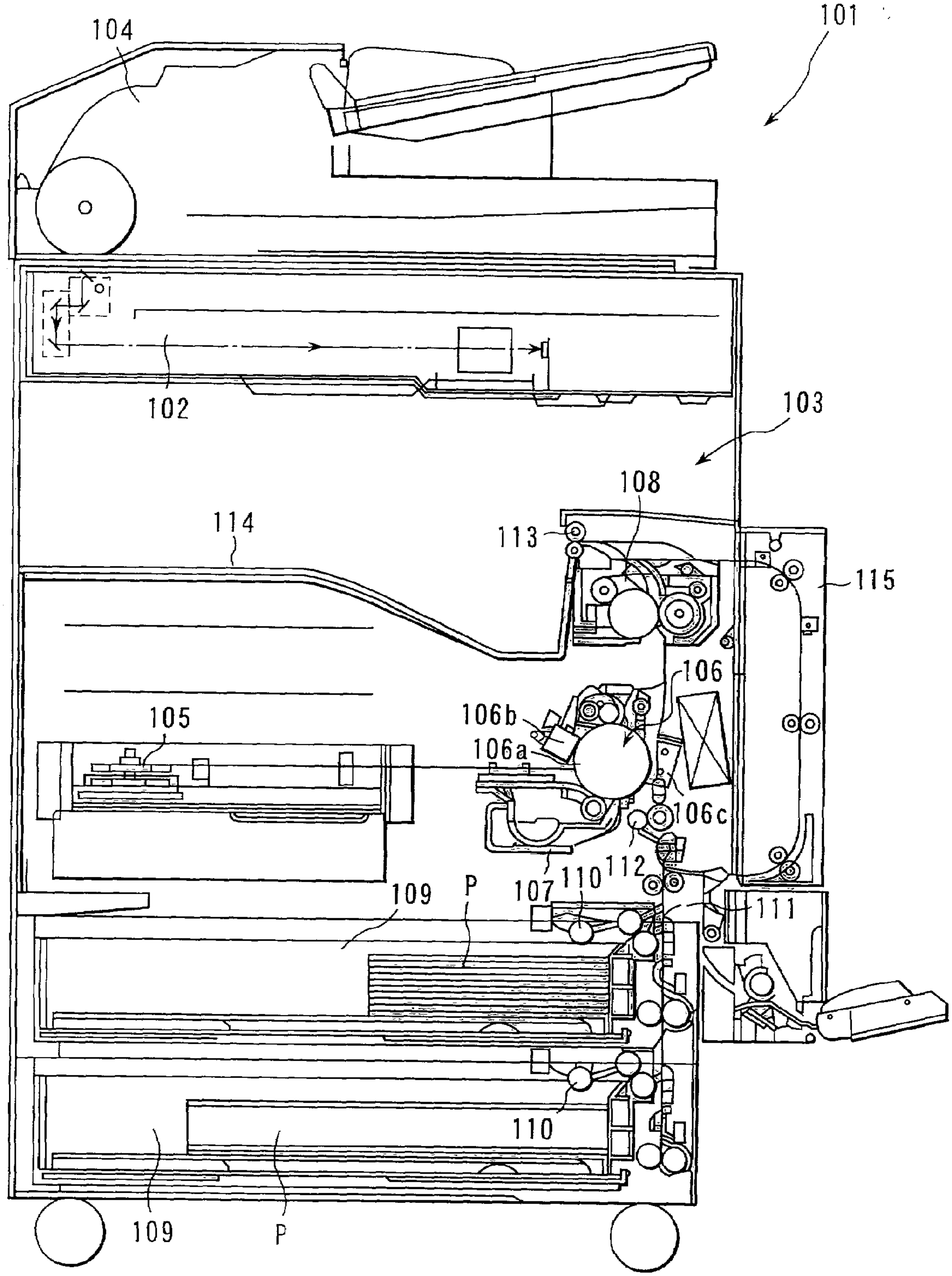
FIG. 1 is a schematic view useful in explaining a structure example of the entire image forming apparatus according to an embodiment of the invention.

As shown in FIG. 1, a digital copy apparatus 101 includes a scanner 102 for reading, as information on light and dark, image information contained in a book to be copied or a document in the form of an arbitrary-selected number of sheets, thereby generating an image signal, and an image forming section 103 for forming an image corresponding to an image signal supplied from the scanner 102 or from the outside. The scanner 102 is integrated with an automatic document feeder (ADF) 104, which is operable in synchronism with the reading operation of the scanner 102 for sequentially exchanging, with one another, to-be-copied objects in the form of sheets.

The image forming section 103 includes a lot of element mechanisms such as: an exposure unit 105 that emits a laser beam having its intensity continuously varied in accordance with image information supplied from the scanner 102 or from the outside; an imaging unit 106 including a photosensitive drum 106*a* on which a latent image is formed when the exposure unit 105 emits a laser beam thereto, a charger unit 106*b* that applies a predetermined potential to the photosensitive drum 106*a*, and a transfer unit 106*c* that transfers a toner image formed on the photosensitive drum 106*a*; a developing unit 107 that supplies toner T onto the latent image formed on the photosensitive drum 106*a* to develop it; a fixing unit 108 that fixes, on a paper sheet P, the toner image transferred by the transfer unit 106*c* from the photosensitive drum 106*a* to the paper sheet P, which is fed via a conveyance path 111 described later; a deelectrifying unit 106*d* (integrated with the imaging unit 106) that eliminates a charge remaining on the photosensitive drum 106*a*; and a cleaner 106*e* (integrated with the imaging unit 106)

that collects toner remaining on the photosensitive drum 106*a* or paper particles of a paper sheet P carried by the photosensitive drum 106*a*; etc.

The photosensitive drum 106*a* can be formed of, for example, an organic photosensitive conductor (OPC) obtained, for example, by forming an organic photo-sensitive material of a predetermined thickness on a cylindrical base member. Further, a known optical deelectrifying unit (lamp) or an AC charger unit for neutralizing the charge of the photosensitive drum 106*a* can be used as the deelectrifying unit 106*d*.

On the other hand, as the cleaner 106*e*, a brush cleaner for collecting toner while keeping a brush in contact with the surface of the photosensitive drum 106*a*, or a blade cleaner to be brought into contact with the photosensitive drum 106*a* to scratch toner therefrom, or a composite type cleaner obtained by combining those cleaners can be used, as is well known.

In the copy apparatus 101 shown in FIG. 1, upon receiving image information from the scanner 102 or an external device, the exposure unit 105 emits a laser beam, having its intensity varied in accordance with the image information, onto the photosensitive drum 106*a* pre-charged with a predetermined potential by the charger unit 106*b*.

As a result, an electrostatic latent image corresponding to a to-be-copied image is formed on the photosensitive drum 106*a* of the imaging unit 106. The photosensitive drum 106*a* is rotated at a constant speed by a drum motor 33, which will be described later with reference to FIG. 3, before the start of charging by the charger unit 106*b* (and before the emission of a laser beam by the exposure unit 105).

The electrostatic latent image formed on the photosensitive drum 106*a* is developed when the developing unit 107 has supplied toner onto selected portions of the drum, and is then transferred onto a paper sheet P fed from a cassette 109 described later, using an electric field generated by the transfer unit 106*c*.

Paper sheets P are picked one by one up by a pickup roller 110 from the cassette 109 located near the imaging unit 106, and are conveyed toward an aligning roller 112 on a conveyance path 111 directed to the photosensitive drum 106*a*. Each paper sheet P guided to the aligning roller 112 has its position aligned by it with a toner image formed on the photosensitive drum 106*a*, and is fed to a transfer position in which the photosensitive drum 106 faces the transfer unit 106*c*. As a result, a toner image is transferred onto each paper sheet P.

Toner T (image) transferred onto each paper sheet P is conveyed to the fixing unit 108, together with each paper sheet P, and melted and fixed thereon by the fixing unit 108.

Each paper sheet P with an image of toner T fixed thereon by the fixing unit 108 is discharged by a discharge roller 113, to a discharge space (discharge tray) 114 defined between the scanner 102 and the cassette 109. If necessary, a both-side feed unit 115 for reversing the top and back sides of each paper sheet P with an image fixed on one side thereof may be provided between the fixing unit 108 and the cassette 109.

Toner remaining on the photosensitive drum 106*a* without being transferred onto each paper sheet P is guided to a deelectrifying position opposed to a deelectrifying unit 106*d* in accordance with the rotation of the photosensitive drum 106*a*, and is subjected to a deelectrifying process. In accordance with further rotation of the photosensitive drum 106*a*, the remaining toner is guided to a cleaning region, in which the surface of the photosensitive drum 106*a* is brought into contact with the cleaner 106*e*, and hence the remaining toner is collected by it.

Figure 2:
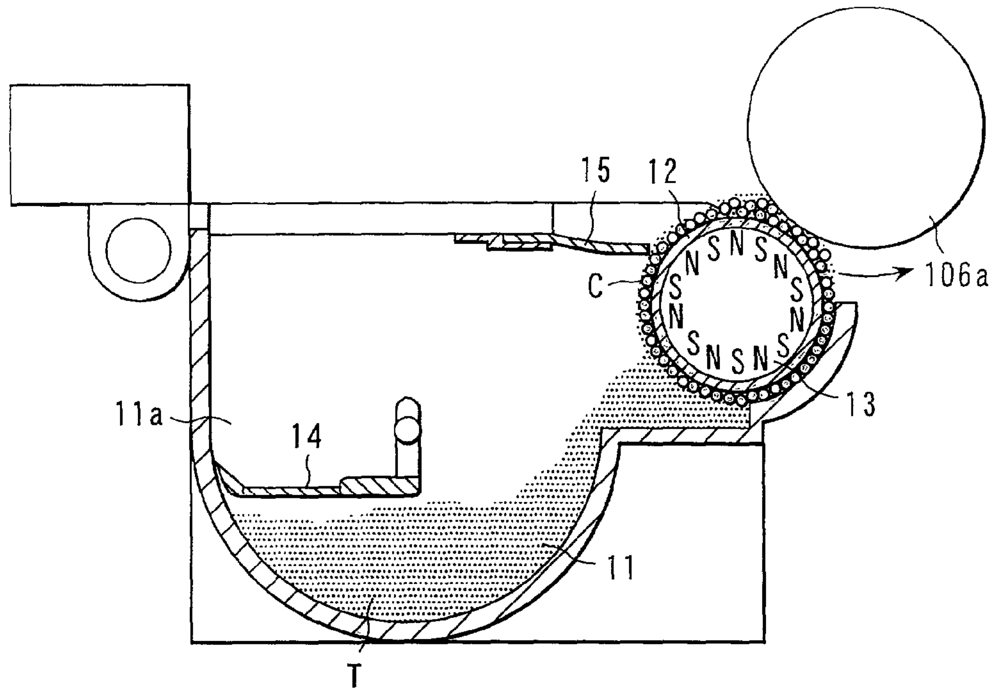
FIG. 2 is a schematic view useful in explaining an example of a developing unit incorporated in the image forming apparatus of FIG. 1.

The developing unit 107 will now be described in detail. As shown in FIG. 2, in the developing unit 107, a developing sleeve 12 with a magnet roller 13 rotatably provided therein is opposed, by a housing 11, to a predetermined portion of the photosensitive drum 106*a* of the imaging unit 106.

A toner container 11*a* for containing toner, to be supplied to the developing sleeve 12 during the time an image forming process is continued, is formed integral with the housing 11 as one body at a predetermined position in the housing 11, i.e., at a predetermined position remoter from the photosensitive drum 106*a* than the developing sleeve 12 (the magnet roller 13). The toner container 11*a* contains an agitator 14 that is rotatable along the inner wall of the toner container 11*a* for agitating and charging toner and guiding it toward the developing roller 12.

The developing sleeve 12 and magnet roller 13 are configured to be rotatable independently of each other. The developing sleeve 12 is located such that the minimum distance between the outer peripheral surface of itself and that of the photosensitive drum 106*a* is about 0.35 mm. Further, the developing sleeve 12 has a diameter of 20 mm and is rotated at a movement speed of, for example, 254 mm/sec in the same direction as the direction of rotation of the photosensitive drum 106*a*, at a position at which it is opposed to the outer peripheral surface of the photosensitive drum 106*a* (the directions of rotation of the axes-of-rotation are opposite to each other).

The magnet roller 13 has, for example, fourteen poles, positioned at substantially regular intervals around the circumference in an alternate N/S pole fashion, as viewed axis-on. Each magnet of the magnet roller 13 has a magnetic force of about 700 Gauss when measured at the surface of the developing sleeve 12. Further, the magnetic roller 13 is rotated at, for example, 2000 rpm in a direction opposite to the movement direction of the outer peripheral surface of the developing sleeve 12 (the directions of rotation of the axes-of-rotation are opposite to each other).

A doctor blade 15 for adjusting, to a predetermined thickness, toner applied by the agitator 14 onto the outer peripheral surface of the developing sleeve 12, i.e., a toner layer, is provided around the developing sleeve 12 at a predetermined position upstream of a portion of the sleeve 12 closest to the drum, with respect to the direction of rotation of the sleeve 12. The doctor blade 15 is positioned so as to set, at, for example, about 0.25 mm, the minimum distance between its tip and the outer peripheral surface of the developing sleeve 12, and at the same time so as not to interfere the circular locus of the agitator 14, which is assumed when the agitator is rotated.

The developing unit 107 is supplied with a start agent (a developer) containing 50 g of carrier (C) and 150 g of toner (T) at the start of an operation (including an initial operation after shipping or a re-setup operation after maintenance work), and supplied with only toner when replenishing toner while an image forming process is being continued. The carrier is an Mn—Mg alloy-based ferrite carrier with an average particle diameter of, for example, 60 μm. Further, the toner is magnetic, and is formed by mixing magnetic particles (magnetic material) with styreneacryl-based resin particles in substantially the same percentage as the magnetic particles, thereby forming a particle mixture with an average particle diameter of, for example, 9 μm, and then attaching, to the particles of the mixture, magnetic particles of the same material as the above in an amount that accounts for about 5% of the weight of the mixture particles.

Figure 3:
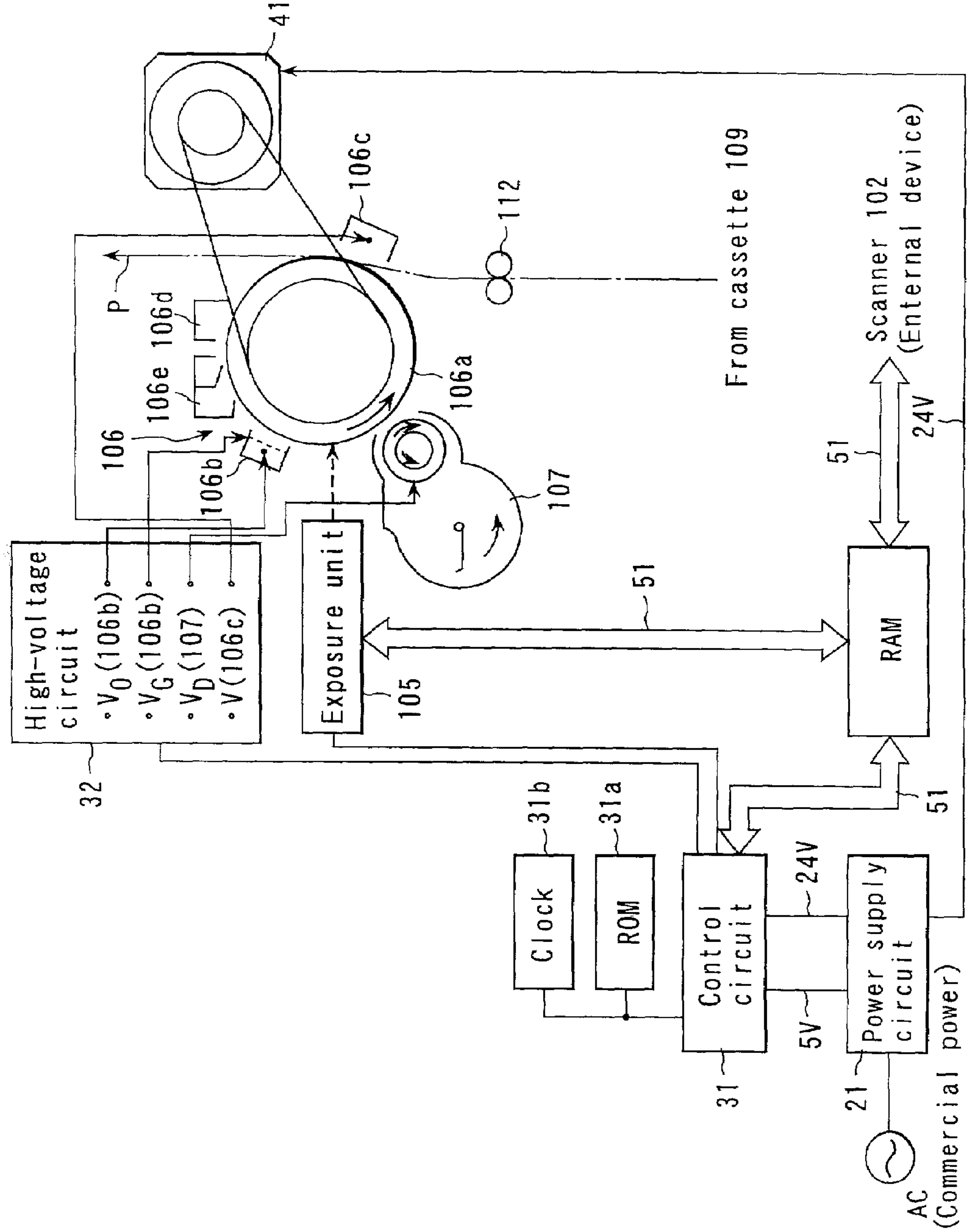
FIG. 3 is a schematic view useful in explaining an example of an arrangement and electrical connection of a photosensitive drum (imaging unit) incorporated in the image forming apparatus of FIG. 1, the developing unit of FIG. 2, and mechanisms and units provided around the photosensitive drum for image forming.

As shown in FIG. 3, the digital copy apparatus 101 includes a power supply circuit 21 for outputting, from the commercial power supply, a predetermined voltage necessary for the operation of each element of the apparatus. The power supply circuit 21 outputs, for example, ±5V and 24V from the commercial power supply.

The power supply circuit 21 is connected to a control circuit 31 for controlling the operation of each element of the apparatus; a high-voltage circuit 32 for supplying a predetermined voltage to the charger unit 106 of the imaging unit 106, the developing sleeve 12 of the developing unit 107, and the transfer unit 106*c*; a drum motor 41 for rotating the photosensitive drum 106*a* at a predetermined rotational speed; and the exposure unit 105, etc. The high-voltage circuit 32, drum motor 41 and exposure unit 105 are connected to the control circuit 31.

The control circuit 31 is connected to the exposure unit 105 via a RAM 33 which stores image data supplied from an external apparatus or the scanner 102, and an image bus 51 which can transmit image data at high speed.

The control circuit 31 includes a clock circuit 31*a* for generating a reference clock, and a ROM section 31*b* which prestores operation programs, the clock circuit and the ROM section being integrated as one body. The control circuit is powered by 5V from the power supply circuit 21, and controls each element and circuit connected thereto. When image data has been input from an external apparatus or the scanner 102, it is stored into the RAM 33 via the image bus 51 under the control of the control circuit 31.

The high-voltage circuit 32 supplies, under the control of the control circuit 31, a charger voltage $V_0$ for corona discharge and a control voltage $V_G$ for a grid electrode, from the charger unit 106*b* of the Scorotron type to the photosensitive drum 106*a*.

As a result, the photosensitive drum 106*a* is charged with, for example, −625V (a surface potential of −625V is applied thereto).

The high-voltage circuit 32 can vary at least the charger voltage $V_0$ for corona discharge or the grid bias voltage $V_G$, or both of them, using, for example, a D/A converter. Furthermore, while the corona discharge voltage $V_0$ and the control voltage $V_G$ are being continuously supplied from the charger unit 106*b*, the photosensitive drum 106*a* is rotated at a constant speed by the drum motor 41, which is rotated at a predetermined rotational speed under the control of the control circuit 31.

The high-voltage circuit 32 applies, under the control of the control circuit 31, a predetermined developing bias voltage $V_B$ to the toner contained in the developing sleeve 12 and the housing 11 of the developing unit 107. Similarly, a predetermined transfer bias voltage, as an output from the high-voltage power supply 32 under the control of the control circuit 31, is applied to the transfer unit 106*c*.

In the digital copy apparatus 101 shown in FIG. 3, image data is stored in the RAM 33 via the image bus 51 under the control of the control circuit 31, when a to-be-read object (not shown) has been set on the ADF 104 and an instruction to execute an image forming process has been issued, or when the scanner 102 has started the output of image data, or when an external apparatus (not shown) has issued an instruction to execute an image output process and the transfer of image data has been started.

The image data stored in the RAM 33 is developed into serial data in accordance with a routine stored in the ROM 31*b*. This serial data is supplied from the control circuit 31 to the exposure unit 105 at a predetermined timing, for example, when the rotational speed of a polygon mirror (not shown) incorporated in the exposure unit 105 has reached a steady rotation state, or when the output intensity of a laser diode (not shown) has reached a stable range, etc.

Before supplying the serial data to the exposure unit 105, or at a predetermined timing during the time the serial data is developed, the drum motor 41 is rotated at a predetermined speed under the control of the control circuit 31, thereby rotating the photosensitive drum 106*a* at a predetermined speed.

In synchronism with the rotation of the photosensitive drum 106*a*, or when the rotational speed of the drum has reached a predetermined value, the control circuit 31 issues an instruction to output a predetermined voltage from the high-voltage circuit 32, thereby applying the predetermined high voltage $V_0$ and control voltage $V_G$ to a corona wire and a grid screen, incorporated in the charger unit 106*b*, respectively.

At the same time, or at a predetermined timing, a developing motor (not shown) rotates, at a predetermined speed, the developing sleeve 12 and magnet roller 13 of the developing unit 107 under the control of the control circuit 31. Furthermore, at a predetermined timing, a predetermined developing bias voltage $V_D$ is supplied from the high-voltage circuit 32 to the developing sleeve 12 and the magnet roller 13 under the control of the control circuit 31. Also, a feed roller 110 provided in that one of the cassette 109, which contains paper sheets P of a size indicated by the size of image data stored in the RAM 33 and a size (magnitude) set for a to-be-output image, is rotated under the control of the control circuit 31. As a result, a paper sheet P of the indicated size is picked up from the one of the cassette 109 and conveyed through the conveyance path 111. When the paper sheet P has reached a predetermined position, i.e., when it has been detected by an aligning switch (not shown) located immediately before the aligning roller 112, it is stopped by the aligning roller 112.

After that, when the surface potential of the photosensitive drum 106*a* has reached a predetermined value, and the rotational speed of the drum has come to be steady, and the arrival of the paper sheet P at the aligning roller 112 has been detected with the developing bias voltage normally applied, image data developed into serial data via the image bus 51 is supplied from the RAM 33 to the exposure unit 105. As a result, the intensity of a laser beam emitted from a laser diode (not shown) in the exposure unit 105 is varied in accordance with the image data. Accordingly, the potential of selected portions of the photo-sensitive drum 106*a* is attenuated in accordance with the image data, i.e., the intensity of the laser beam, whereby a (electrostatic) latent image is formed on the photosensitive drum 106*a*.

The latent image formed on the photosensitive drum 106*a* is developed by applying toner to selected portions of the drum using the developing sleeve 12 of the developing unit 107.

The developed image, i.e., a toner image, is guided to a transfer region opposed to the transfer unit 106*c* in accordance with the rotation of the photosensitive drum 106*a*.

The toner image guided to the transfer region is transferred, by a transfer bias voltage applied from the transfer unit 106*c* to the photosensitive drum 106*a*, onto the paper sheet P, which has reached the transfer region as a result of the rotation of the aligning roller 112 occurring in synchronism with, for example, the start of the output of the laser beam from the exposure unit 105.

The toner image transferred onto the paper sheet P and electrostatically attached thereto is guided to the fixing unit 108, where toner is melted by the heat supplied therefrom and fixed on the paper sheet P.

This is the termination of a series of image forming operations (the output of an image).

As described above, the developing method for use in the developing unit 107 is a semi two-component method. Therefore, in the developing region in which the developing sleeve 12 is opposed to the photo-sensitive drum 106*a*, magnetic particles attached to toner T exist as well as carrier C and toner T.

Although the magnetic particles attached is useful in enhancing the build up of the charge characteristic of toner T, they will be separated from the surface of toner as a result of pressure applied between the developing sleeve 12 and the doctor blade (toner-layer-thickness adjusting member) 15, pressure and friction applied by the toner agitation mechanism (agitator 14), and/or stress represented by friction between toner particles, etc.

The magnetic particles separated from the surface of toner may remain on the surface of the developing sleeve 12 or at a predetermined position in the developing unit 107, thereby causing white-background fogging on a non-imaging section (white background section).

Figure 4A:
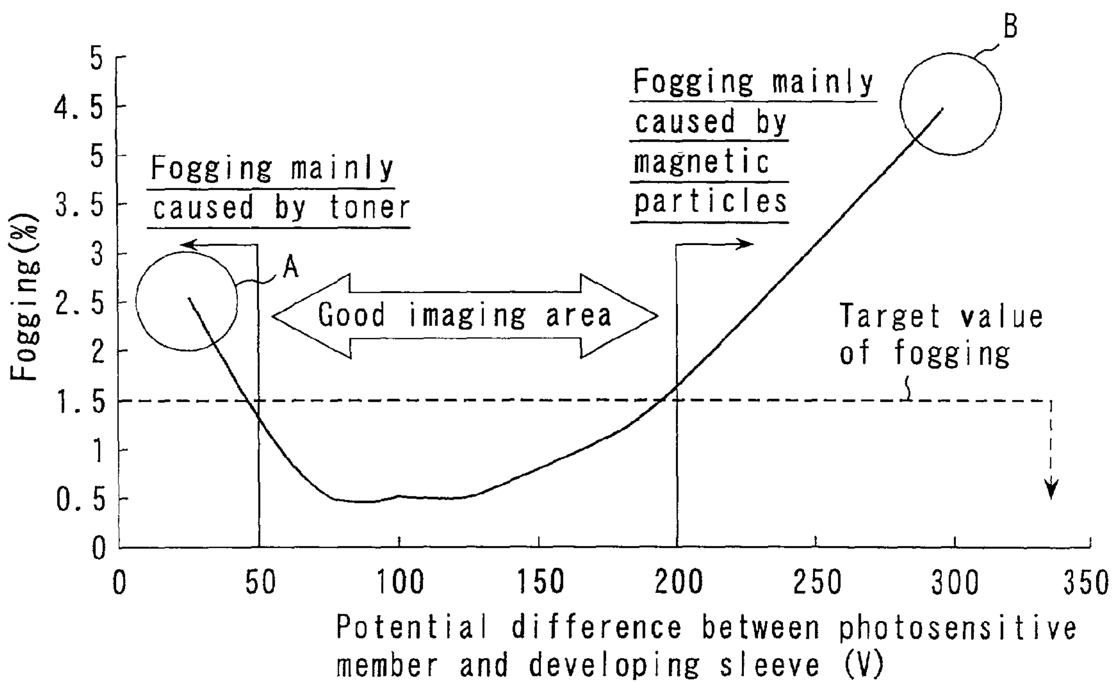
FIG. 4A is a graph illustrating an example of a relationship between "the potential difference of a developing sleeve and the photosensitive drum" and "the density of fogging", which is found when forming an image using the image forming apparatus shown in FIGS. 1 and 2.

As shown in FIG. 4A, the white-background fogging depends upon the potential difference between the developing sleeve and the photosensitive drum. As is evident from FIG. 4A, there are two areas A and B, in which the degree of the white-background fogging is high.

Figure 4B:
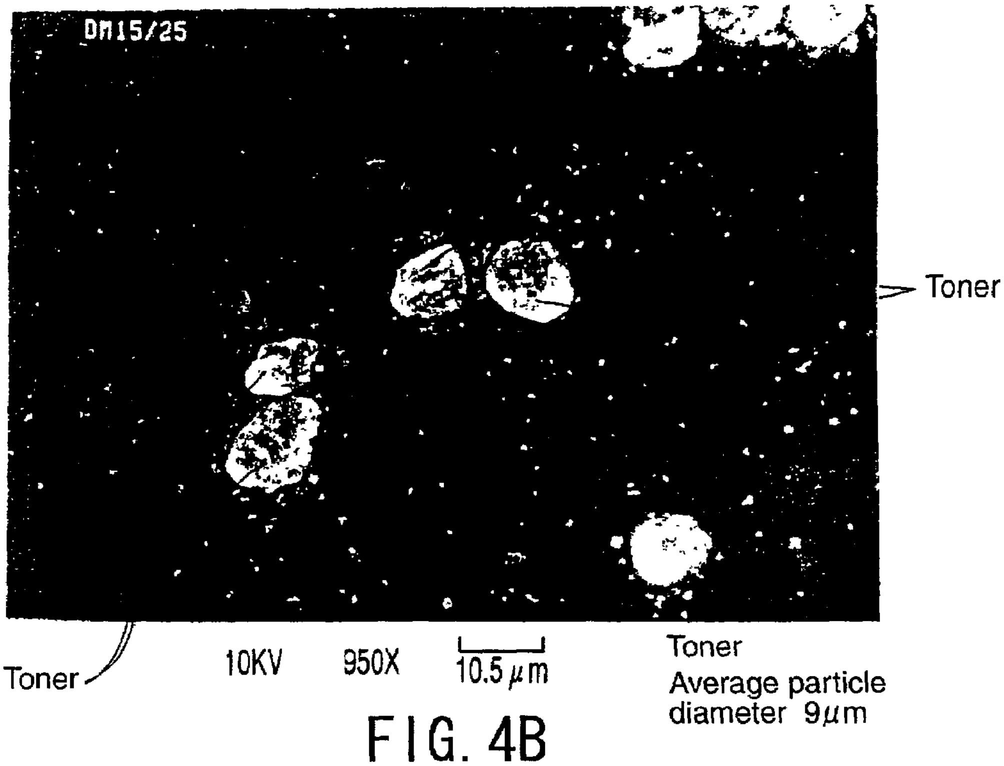
FIGS. 4B and 4C are schematic views illustrating states, in which an attachment is attached to the surface of the photosensitive drum, assumed when the "fogging density", explained with reference to FIG. 4A, exceeds an allowable value.

One of the areas is where the "potential difference between the developing sleeve and the photosensitive drum" is less than 50V, i.e., the area A. In this area, an outstanding phenomenon as shown in FIG. 4B occurs. FIG. 4B is an enlarged view of the surface of the photosensitive drum 106*a*. As shown, toner T itself remains on the photosensitive drum 106*a*.

Specifically, if the difference between the developing bias voltage $V_B$ applied to the developing unit 107 and a surface potential SP applied to the photosensitive drum 106*a* is smaller than 100V, and in particular, than 50V, it is considered that toner T, which has the same polarity as the non-imaging section of the photosensitive drum 106*a*, and hence generally, is not attached thereto, remains on the non-imaging section of the drum 106*a* for some reason.

Figure 4C:
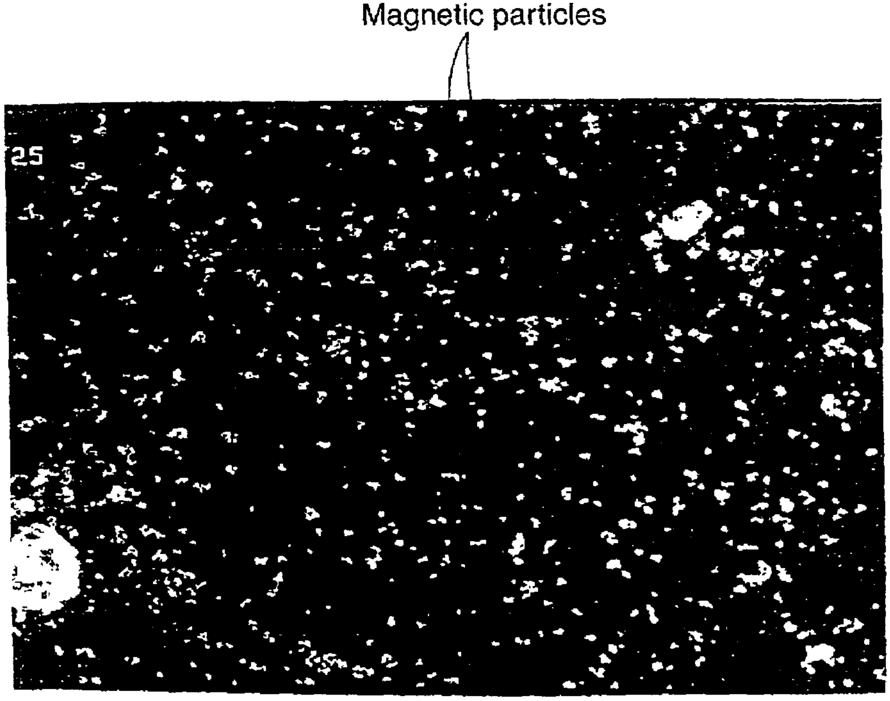
Figure 5:
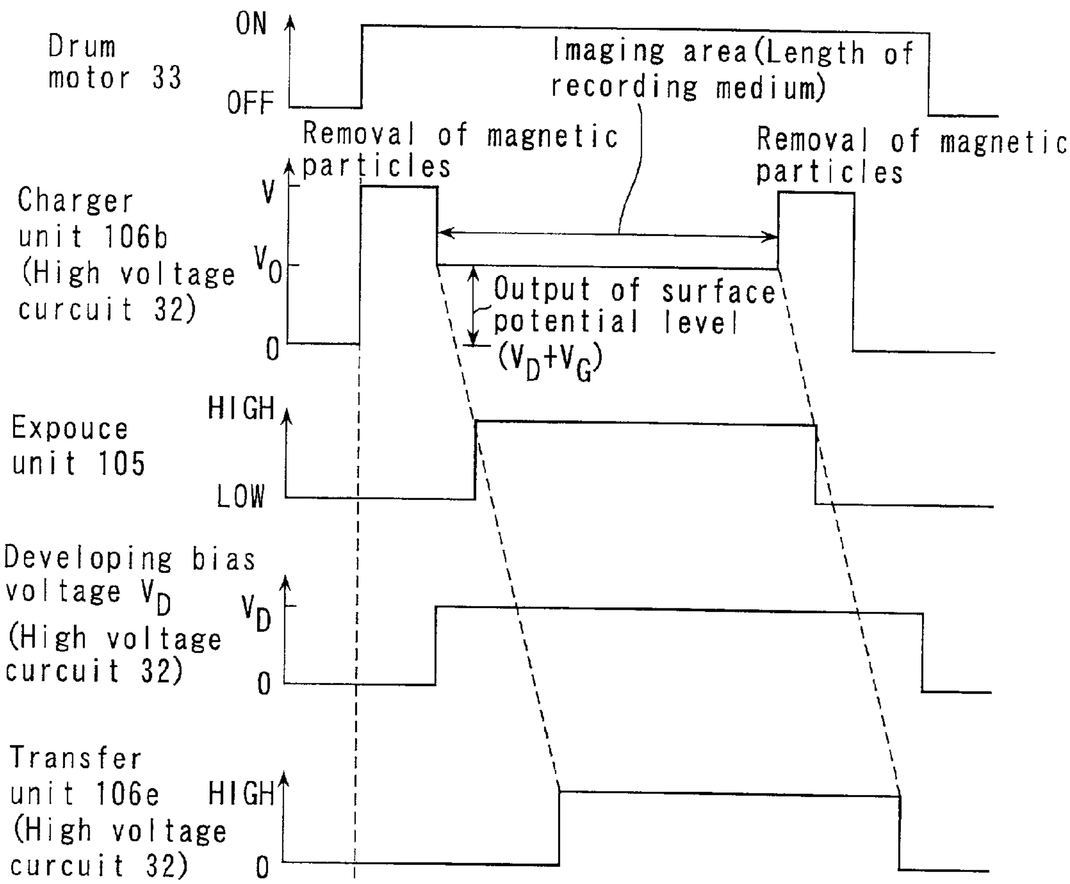
FIG. 5 is a timing chart useful in explaining examples of application timings of voltages applied to the photosensitive drum by a charger unit when the image forming apparatus shown in FIGS. 1 and 3 forms an image.

The other area is caused by magnetic particles separated from the surface of toner, as is evident from FIG. 4C, which is an enlarged view of the surface of the photosensitive drum 106*a*.

It is proper to consider that the cause behind the occurrence of the other area is that even if the magnetic particles separated from toner is again charged as a result of the friction therebetween in the developing region, they have a weak voltage of about 0V, and hence the number of magnetic particles increases as the "potential difference between the developing sleeve and the photosensitive drum" increases.

In particular, in the relationship between the surface potential SP of the photosensitive drum 106*a* and the developing bias voltage $V_B$ employed in the embodiment, the above phenomenon is conspicuous in the area B in which the potential difference exceeds 200V. Further, in the relationship between the surface potential SP of the photosensitive drum 106*a* and the developing bias voltage $V_B$ employed in the embodiment, if the "potential difference between the developing sleeve and the photosensitive drum" exceeds, for example, 600V, a new problem that carrier C is attached to the surface of the photosensitive drum 106*a* will occur.

When an instruction to form an image on two or more sheets has been issued, even if the "potential difference between the developing sleeve and the photosensitive drum" in the transfer region is set larger than that set during an image forming operation, no problems will occur in resultant images during an interval, in which no paper sheet P exists, between a time at which one paper sheet P exists and a time at which a subsequent paper sheet P exists, or before each paper sheet P reaches the transfer region, or before the rotation of the photosensitive drum 106*a* is stopped after each paper sheet P passes through the transfer region. Further, when an instruction to form an image only on one paper sheet has been issued, even if the potential difference in the transfer region is set larger than that set during the image forming operation, no problems will occur in resultant images before each paper sheet P reaches the transfer region, or before the rotation of the photosensitive drum 106*a* is stopped after each paper sheet P passes through the transfer region.

In other words, during a non-image-forming operation, magnetic particles separated from toner and placed on the photosensitive drum 106*a* can be firmly held thereon by changing the developing bias voltage $V_B$ or the charger voltage $V_0$ or both of them so as to increase the "potential difference between the developing sleeve and the photosensitive drum".

Using this, when an instruction to form an image on two or more sheets has been issued, in order to set the "potential difference between the developing sleeve and the photosensitive drum" in the transfer region larger than that during the image forming operation, the charger voltage $V_0$ output from the high-voltage circuit 32, for example, is increased under the control of the control circuit 31 during an interval, in which no paper sheet P exists, between a time at which one paper sheet P exists and a time at which a subsequent paper sheet P exists, or before each paper sheet P reaches the transfer region, or before the rotation of the photosensitive drum 106*a* is stopped after each paper sheet P passes through the transfer region. Similarly, when an instruction to form an image only on one paper sheet has been issued, the charger voltage $V_0$ is increased under the control of the control circuit 31 for the same purpose as above, before each paper sheet P reaches the transfer region, or before the rotation of the photosensitive drum 106*a* is stopped after each paper sheet P passes through the transfer region. In these cases, the transfer bias voltage applied to the transfer unit 106*c* by the high-voltage circuit 32 is simultaneously stopped, thereby holding (collecting) magnetic particles by the photosensitive drum 106*a*, and then collecting and removing the particles from the drum by, for example, the cleaner 106*e* so that they are not transferred onto a paper sheet P.

For example, the developing bias voltage applied to the developing sleeve 12, the surface potential applied to the photosensitive drum 106*a* are set at −500V and −625V, respectively, and the charger voltage $V_0$ output from the high-voltage circuit 32 is varied under the control of the control circuit 31 during the non-image-forming operation so as to vary the surface potential to the photosensitive drum 106*a* to −800V. As a result, magnetic particles attached to the photosensitive drum 106*a* are conveyed, together with the photosensitive drum 106*a*, to the cleaning position opposed to the cleaner 106*e*, and can be collected by the cleaner 106*e*. The difference between the surface potential of the photosensitive drum 106*a*, which can collect magnetic particles, and the developing bias voltage $V_D$ applied to the developing sleeve 12 is set at substantially 200V or more, more preferably, at twice or more the potential difference therebetween during the output of an image, in the combination of photosensitive drum and toner employed in the present invention. Needless to say, the optimal potential difference depends upon the combination of photosensitive drum and toner.

If the volume of the case (housing) of the transfer unit 106*c* is increased, or a passage from the case of the transfer unit to a dedicated collecting section is provided, for collecting magnetic particles into the case or the collecting section, it is not necessary to vary the transfer bias voltage applied to the transfer unit 106*c*.

Figure 6:
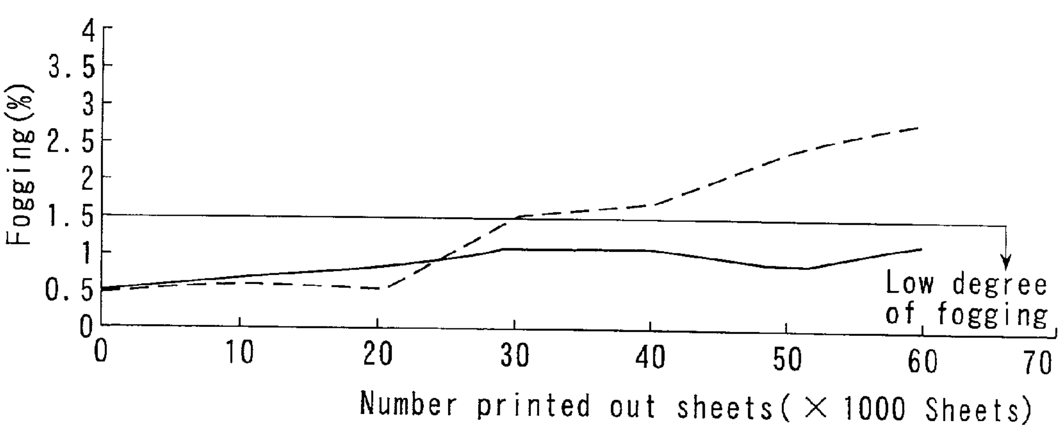
FIG. 6 is a graph illustrating an example of a difference in the degree of "variations in fogging density" between a case where an image forming method of the invention is employed, and a case where a conventional image forming method as a comparative is employed.

FIG. 6 is a graph illustrating changes in the fogging density of output images obtained by a predetermined number of image forming operations using the image forming method of the invention, and changes in that obtained by a predetermined number of image forming operations using a conventional image forming method.

As is clear from FIG. 6, the present invention can provide high-quality output images with a low fogging density even if the image forming operation is repeatedly executed, by virtue of the following process. When an instruction to form an image on two or more sheets has been issued, in order to set the "potential difference between the developing sleeve and the photosensitive drum" in the transfer region larger than that during the image forming operation, the charger voltage $V_0$ output from the high-voltage circuit 32, for example, is increased under the control of the control circuit 31, and a magnetic-particle-collecting routine is employed, during an interval, in which no paper sheet P exists, between a time at which one paper sheet P exists and a time at which a subsequent paper sheet P exists, or before each paper sheet P reaches the transfer region, or before the rotation of the photosensitive drum 106*a* is stopped after each paper sheet P passes through the transfer region. Similarly, when an instruction to form an image only on one paper sheet has been issued, the charger voltage $V_0$ is increased under the control of the control circuit 31 and the magnetic-particle-collecting routine is employed for the same purpose as above, before each paper sheet P reaches the transfer region, or before the rotation of the photosensitive drum 106*a* is stopped after each paper sheet P passes through the transfer region.

As described above, in the image forming method of the invention, even if magnetic particles attached to toner are separated and attached to the photosensitive drum, they can be collected during a non-imaging process, and therefore the increase of the density of fogging can be suppressed even after the image forming process is continuously repeated.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for supplying a visualizing agent to a latent image to thereby form an image, comprising:

a visualizing agent formed of a mixture of a resin material and first magnetic particles, the ratio of the first magnetic particles to the resin material being predetermined, second magnetic particles of a same material as the first magnetic particles being attached to a surface of the mixture;

a recording-medium conveyance mechanism which can convey a recording medium which holds thereon the visualizing agent stuck to selected portions of a latent image carrier;

a first voltage supply unit which can output a first voltage to charge the latent image carrier with a predetermined potential, and also which can output a second voltage, differing from the first voltage, to charge the latent image carrier with another predetermined potential;

a second voltage supply unit which can output a third voltage, differing from the first and second voltages, to attach the visualizing agent to the selected portions of the latent image carrier; and a collecting unit which can collect the attached second magnetic particles when the second magnetic particles are separated from the visualizing agent attached on the latent image carrier by a difference between the third voltage supplied from the second voltage supply unit and the second voltage supplied from the first voltage supply unit.

2. The apparatus according to claim 1, wherein the first voltage supply unit can output the second voltage only during a predetermined time period in which the recording medium is not conveyed by the recording-medium conveyance mechanism.

3. The apparatus according to claim 1, wherein when the first voltage supply unit has output the second voltage, a difference between the third voltage supplied from the second voltage supply unit and the first voltage supplied from the first voltage supply unit is increased.

4. The apparatus according to claim 2, wherein when the first voltage supply unit has output the second voltage, the collecting unit collects the second magnetic particles separated from the visualizing agent and attached to the latent image carrier.

5. The apparatus according to claim 3, wherein when the first voltage supply unit has output the second voltage, the collecting unit collects the second magnetic particles separated from the visualizing agent and attached to the latent image carrier.

6. The apparatus according to claim 4, further comprising a visualizing-agent transfer mechanism which can supply a fourth voltage, differing from the first to third voltages, to the latent image carrier and the visualizing agent attached to the latent image carrier, thereby transferring the visualizing agent attached to the latent image carrier, onto the recording medium conveyed by the recording-medium conveyance mechanism.

7. The apparatus according to claim 6, wherein the visualizing-agent transfer mechanism has a volume capable of containing the second magnetic particles separated from the visualizing agent.

8. An image forming apparatus comprising:

a photosensitive unit which can hold, as a latent image, a potential difference between an exposed portion thereof which is irradiated with light, and a non-exposed portion thereof which is not irradiated with light, when light has been emitted onto the photosensitive unit charged with a predetermined potential;

a charger unit which can output a first voltage used to supply a predetermined surface potential to the photosensitive unit, and also output a second voltage differing from the first voltage;

an exposure unit which can emit light onto the photosensitive unit supplied with the predetermined surface potential from the charger unit, the light having its intensity varied in accordance with image data;

a developing unit including a sleeve opposed to the photosensitive unit with a predetermined space defined therebetween, the developing unit supplying the surface of the photosensitive unit with toner, thereby developing the latent image held on the photosensitive unit, the toner being formed of a resin material containing first magnetic particles, the ratio of the first magnetic particles to the resin material being predetermined, second magnetic particles, of a same material as the first magnetic particles, being attached to a surface of the toner;

a recording-medium conveyance mechanism which can convey, to the photosensitive unit, a recording medium which can electrostatically hold the toner supplied by the developing unit to the latent image on the photosensitive unit;

a transfer unit which can electrostatically transfer the toner supplied by the developing unit to the latent image on the photosensitive unit, onto the recording medium conveyed to the photosensitive unit by the recording-medium conveyance mechanism;

a recording-medium discharge mechanism which can convey, to a predetermined position, the recording medium with the toner electrostatically transferred by the transfer unit from the photosensitive unit;

a developing-bias-voltage supply unit which can supply the sleeve of the developing unit with a third voltage that differs by a predetermined potential from the first voltage applied to the photosensitive unit by the charger unit;

a voltage control circuit which can change a voltage, applied by the charger unit to the photosensitive unit, from the first voltage to the second voltage for a predetermined time period in which no toner is electrostatically transferred by the transfer unit onto the recording medium conveyed by the recording-medium conveyance mechanism, so as to set a difference between the second voltage and the third voltage applied to the sleeve of the developing unit by the developing-bias-voltage supply unit, larger than a difference between the first and third voltages; and a collecting unit which can collect the second magnetic particles separated from the toner and existing on the photosensitive unit.

9. The image forming apparatus according to claim 8, wherein when an instruction to form an image on two or more members of the recording medium has been issued, a time, at which the voltage control circuit can change the voltage, applied by the charger unit to the photosensitive unit, from the first voltage to the second voltage so as to set the difference between the second voltage and the third voltage larger than the difference between the first and third voltages, is a time during an interval between a time at which one member of the recording medium is conveyed and a time at which a subsequent member of the recording medium is conveyed, or before any one of the recording medium reaches the transfer region in which the transfer unit is opposed to the photosensitive unit, or before the rotation of the photosensitive unit is stopped after said any one of the recording medium passes through the transfer region, and when an instruction to form an image only on one member of the recording medium has been issued, the time, at which the voltage control circuit can change the voltage, is before the recording medium reaches the transfer region, or before the rotation of the photosensitive unit is stopped after the recording medium passes through the transfer region.

10. The image forming apparatus according to claim 8, wherein the transfer unit supplies the photosensitive unit and the toner attached to the photosensitive unit with a fourth voltage differing from the first to third voltages, thereby transferring the toner attached to the photosensitive unit, onto the recording medium conveyed by the recording-medium conveyance mechanism.

11. The image forming apparatus according to claim 10, wherein the transfer unit has a volume capable of containing the second magnetic particles separated from the toner.

12. An image forming method of supplying a visualizing agent onto a latent image to form an image, comprising:

forming a latent image on an optical semiconductor by emitting light selected portions of the optical semiconductor with a predetermined potential applied to the optical semiconductor;

supplying toner to the latent image formed on the optical semiconductor, while applying a predetermined bias voltage to the optical semiconductor; and collecting, in a predetermined time period in which a recording medium does not exist in a transfer region defined between the optical semiconductor and a transfer unit, other than when the toner is being transferred onto the recording medium, magnetic particles separated from the toner attached to the optical semiconductor, into a predetermined collecting section, by increasing the potential of the optical semiconductor, so as to set a difference between the developing bias voltage and the potential of the optical semiconductor larger than a difference therebetween assumed when the toner is being transferred onto the recording medium.

13. The image forming method according to claim 12, wherein the magnetic particles are conveyed by the optical semiconductor to the predetermined collecting section.

* * * * *